United States Patent [19]

Jovanovich et al.

[11] Patent Number: 5,495,500
[45] Date of Patent: Feb. 27, 1996

[54] HOMODYNE RADIO ARCHITECTURE FOR DIRECT SEQUENCE SPREAD SPECTRUM DATA RECEPTION

[75] Inventors: Alan F. Jovanovich, Des Moines; Bruce G. Warren, Poulsbo, both of Wash.

[73] Assignee: Intermec Corporation, Everett, Wash.

[21] Appl. No.: 287,645

[22] Filed: Aug. 9, 1994

[51] Int. Cl.[6] .................................................. H04B 1/707
[52] U.S. Cl. ........................... 375/206; 375/200; 375/316
[58] Field of Search ....................... 375/1, 75, 200–210, 375/316; 380/34

[56] References Cited

U.S. PATENT DOCUMENTS

| | | | |
|---|---|---|---|
| 4,736,390 | 4/1988 | Ward et al. | 375/75 |
| 5,241,561 | 8/1993 | Barnard | 375/1 |
| 5,241,566 | 8/1993 | Jackson | 375/303 |

*Primary Examiner*—Bernarr E. Gregory
*Attorney, Agent, or Firm*—Graham & James

[57] ABSTRACT

A homodyne radio system for receiving direct sequence spread spectrum communications enables a received signal to be down-converted directly to a baseband signal. An input RF amplifier receives and amplifies a carrier signal modulated by a digital code sequence. A local oscillator provides a signal having a frequency substantially equal to the frequency of the carrier signal. A phase splitter coupled to the input RF amplifier receives the modulated carrier signal, and splits the signal into corresponding quadrature component signals. The mixer combines a first one of the quadrature component signals with the local oscillator signal to generate a first quadrature baseband output signal. A second one of the quadrature component signals is combined with the local oscillator signal shifted in phase by 90° to generate a second quadrature baseband output signal. A transmitted signal can be generated by mixing quadrature baseband input signals with the same local oscillator and phase shifted local oscillator signals.

20 Claims, 2 Drawing Sheets

HOMODYNE RADIO ARCHITECTURE FOR DIRECT SEQUENCE SPREAD SPECTRUM DATA RECEPTION

BACKGROUND OF THE INVENTION

1. Field of the Invention

The present invention relates to radio receivers and transmitters for direct sequence spread spectrum communications, and more particularly, to a radio system in which a received carrier signal modulated by a digital code sequence is directly down-converted to a baseband output signal.

2. Description of Related Art

Radio systems utilizing spread spectrum modulation techniques are increasingly popular for communications, navigation, radar and other applications. In a spread spectrum system, the transmitted signal is spread over a frequency band that is wider than the minimum bandwidth required to transmit the information being sent. As a result of the signal spreading, spread spectrum systems have reduced susceptibility to interference or jamming, and enable high data integrity and security. Moreover, by spreading transmission power across a broad bandwidth, power levels at any given frequency within the bandwidth are significantly reduced, thereby allowing such systems to operate outside of certain FCC licensing requirements. In view of these significant advantages, spread spectrum communication systems are highly desirable for commercial data transmission.

In one type of spread spectrum communication system, an RF carrier is modulated by a digital code sequence having a bit rate much higher than that of the information signal. These systems are known as "direct sequence" modulation systems. In a direct sequence spread spectrum system the RF carrier is typically modulated by two data streams in quadrature with each one having one phase when the data stream code sequence represents a "one" and 180° phase shift when the data stream code sequence represents a "zero." Since the digital code sequence comprises a pattern of square wave half-periods that vary in duration, the spectral power envelope of a direct sequence modulated signal is of a $[(\sin x)/x]^2$ form. This type of modulation is commonly referred to as Quadrature Phase Shift Key (QPSK) modulation.

The radio receiver recovers the information from the received signal by use of two separate processes. First, the received signal is down-converted from the center frequency, $f_c$, of its RF carrier to a fixed intermediate frequency to enable processing of the signal. Conventional signal processing techniques, such as heterodyne reception, can be applied to down-convert the received signal. Second, the spreading code modulation is removed or demodulated to reveal the information of the signal. Demodulation of the spreading code modulation is accomplished by multiplication with a code reference sequence identical in structure and synchronized in time with the received signal, a process known as correlation. These techniques may be performed simultaneously.

In conventional heterodyne receiving systems, the received signal is beat against a sine wave generated by a local oscillator having a frequency different from the center frequency of the carrier, $f_o$. The mixer generates a set of sum and difference frequencies which correspond to the original received signal. Essentially, the mixer performs a frequency conversion, which results in the received signal being converted to a replica of the received signal at an intermediate frequency (IF) comprising the difference between the carrier frequency and the local oscillator frequency ($f_c-f_o$). This way, the information in the signal can be demodulated at a fixed frequency in an IF stage of the receiver.

A drawback of heterodyne receiving systems is that demodulation at the intermediate frequency requires additional translation mixers and tuned filters to attenuate spurious noise signals that result from the heterodyne down-conversion, adding unnecessary complexity to the receiver circuitry. In addition, the frequency conversion process sometimes allows undesired signals, known as the image frequency, to pass through into the IF signal processing stage. Thus, an important consideration in heterodyne receiver design is rejection of the image frequency components.

A secondary problem relates to systems that both receive and transmit signals. To transmit a signal having the same carrier frequency of the received signal, an oscillator to provide the carrier frequency must be included in the receiving and transmitting system. Since the local oscillator of the heterodyne receiver produces a frequency offset from the carrier frequency, the local oscillator must either be re-tuned for transmission operation, or a second oscillator must be provided. Rapid retuning of the local oscillator is problematic at relatively high transaction rates, and can result in transmission delay. Also, the addition of the second oscillator further increases complexity of the radio system.

Accordingly, a direct sequence spread spectrum radio receiving and transmitting system which avoids the complexity of heterodyne reception would be very desirable.

SUMMARY OF THE INVENTION

In accordance with the teachings of this invention, a homodyne radio architecture for direct sequence spread spectrum data reception is provided. A homodyne radio architecture differs from heterodyne reception systems in that it utilizes a local oscillator at substantially the same frequency as the carrier frequency of the received signal. By beating the received signal against the local oscillator signal at the same frequency, a difference frequency of zero is achieved. Thus, the received signal is down-converted directly to a baseband signal, obviating the need for the additional filtering typical of heterodyne reception. Moreover, the same local oscillator can be used to provide a carrier frequency for a transmitted signal, eliminating the need for retuning of the oscillator or of providing a secondary oscillator.

In a first embodiment of the invention, a radio receiving system comprises an input RF amplifier for receiving and amplifying a carrier signal modulated by a digital code sequence. A local oscillator is provided having a frequency substantially equal to the frequency of the carrier signal. A mixer receives the modulated carrier signal and local oscillator signal, and generates a corresponding baseband output signal.

In a second embodiment of the invention, the capability for transmitting signals is provided. A second mixer combines a first one of quadrature baseband input signals with the local oscillator signal to generate a first transmitted signal quadrature component. A second one of quadrature baseband input signals is combined with the phase shifted local oscillator signal to generate a second transmitted signal quadrature component. A summer coupled to the second mixer combines the first and second transmitted signal quadrature components into the transmitted signal. A switch enables selection between the received signal and the transmitted signal.

A more complete understanding of the homodyne radio architecture for direct sequence spread spectrum data reception will be afforded to those skilled in the art, as well as a realization of additional advantages and objects thereof, by consideration of the following detailed description of the preferred embodiment. Reference will be made to the appended sheets of drawings which will be first described briefly.

DETAILED DESCRIPTION OF THE PREFERRED EMBODIMENT

This invention provides a direct sequence spread spectrum radio receiving and transmitting system which avoids the complexity of heterodyne reception.

Figure 1:
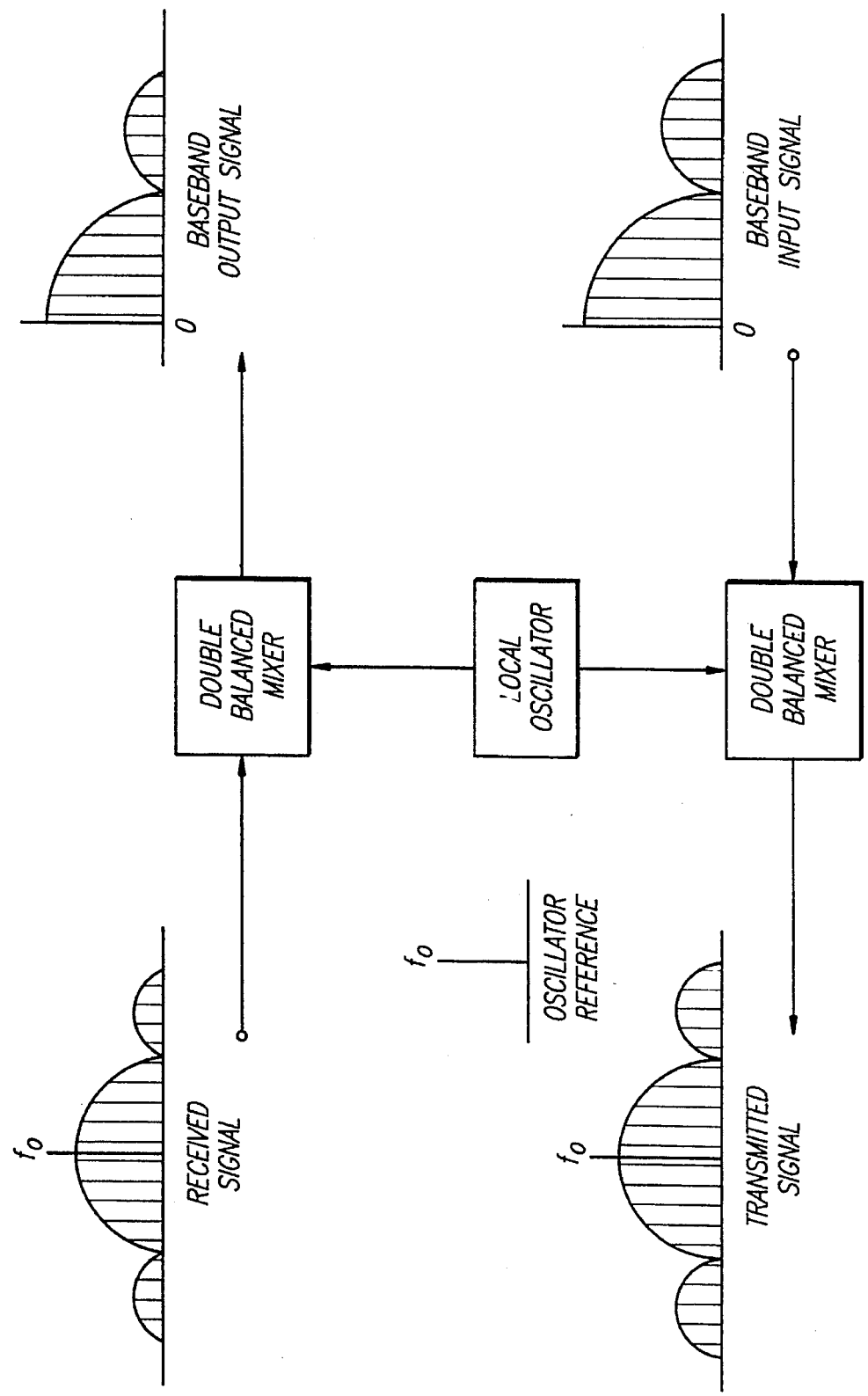
FIG. 1 is a block diagram of a direct sequence spread spectrum radio receiving and transmitting system of the present invention.

Referring first to FIG. 1, a block diagram of a direct sequence spread spectrum radio receiving and transmitting system is illustrated. A received signal comprises a carrier frequency, $f_O$, that is modulated by a digital code sequence. The power spectrum of the received signal is shown as having a $[(\sin x)/x]^2$ form, with a main lobe containing a majority of the power and two side lobes containing much of the harmonic power of the modulation. The main lobe bandwidth is a function of the waveshape and the code rate utilized. The received signal may include quadriphase or biphase components, though it should be apparent that the power spectrum would be identical to that illustrated for either type of signal.

The radio system includes a local oscillator that produces an oscillator reference signal. The local oscillator signal has a frequency, $f_O$, that is substantially identical to the carrier frequency of the received signal. The local oscillator signal is utilized for both receiving and transmitting operations.

In receiving operations, the received signal is mixed with the local oscillator signal by a double balanced mixer. The double balanced mixer produces difference signals comprising the difference between the local oscillator frequency and the carrier frequency, $f_O$. The resulting baseband output signal has a power spectrum that comprises a single sideband replica of the received signal with a center frequency of zero.

In transmitting operation, the process is essentially reversed. A baseband input signal has a similar power spectrum as the baseband output signal, comprising a single sideband with no center frequency. The baseband input signal is provided to a double balanced mixer along with the local oscillator signal, and a transmitted signal is produced. Thus, the transmitted signal comprises the local oscillator signal modulated by a digital code sequence, and has the same carrier frequency, $f_O$, as the received signal. As a result, the power spectrum of the transmitted signal resembles that of the received signal, having the $[(\sin x)/x]^2$ form.

The radio receiving and transmitting system of the invention has numerous significant aspects. The same local oscillator is utilized for both receiving and transmitting operations, and as a result, re-tuning of the local oscillator is not required. The received signal is converted directly to a baseband output signal without the need for additional mixing or intermediate frequency (IF) bandpass filtering as in conventional heterodyne receiving systems. In heterodyne receiving systems operating at high frequencies, it may be very difficult to filter out the image frequency. Since the spread spectrum signal has a bandwidth significantly greater than the minimum bandwidth necessary to transmit the information being sent, both the upper and lower sidebands are received at the same time. Thus, the loss of image frequencies below the carrier frequency by use of homodyne receiving does not represent a loss of information since the intelligence of the signal can be recovered from either sideband.

Figure 2:
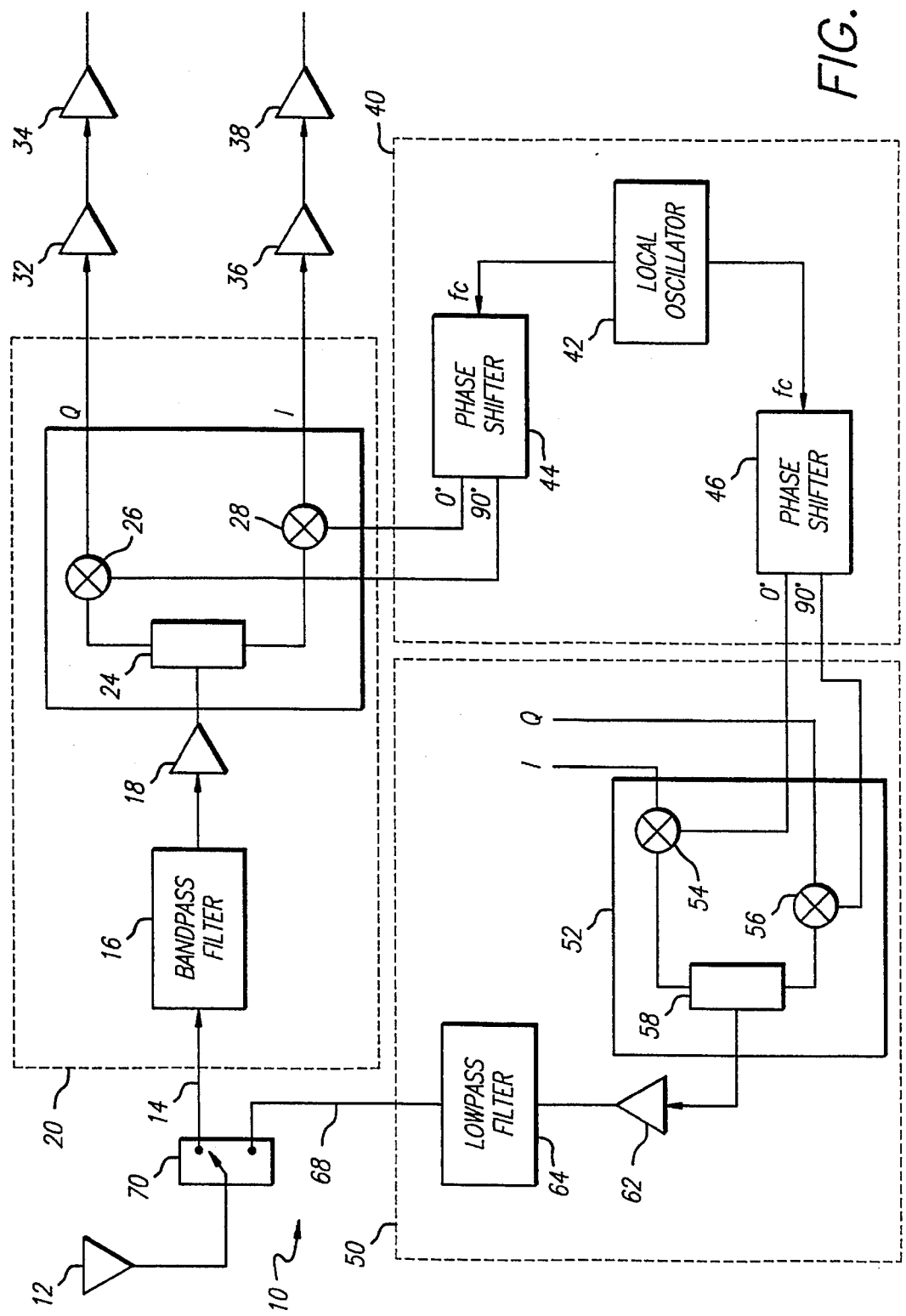
FIG. 2 is a schematic drawing of the receiving and transmitting system of FIG. 1.

Referring now to FIG. 2, an embodiment of the direct sequence spread spectrum radio receiving and transmitting system is illustrated. A radio system 10 includes a receiver section 20, a transmitter section 50, and a local oscillator section 40. An antenna 12 is provided for receiving and transmitting signals to and from the radio system 10, though it should be apparent that alternative structures could be used to function as the antenna, such as conventional electrical wiring within the facility. Since both received and transmitted signals share the same carrier frequency, $f_O$, it should be apparent that coupling circuitry for efficiently conducting RF power to and from the antenna 12 are simplified.

The local oscillator section includes a local oscillator 42, a first phase shifter 44, and a second phase shifter 46. The local oscillator produces a signal comprising a sine wave having a frequency substantially equal to the carrier frequency, $f_O$, and may be provided by a circuit including a crystal reference source and/or frequency synthesizer. Each of the phase shifters 44, 46 receive the local oscillator signal, and split it into two signals including a first in-phase with the local oscillator signal, and a second having a 90° phase shift. The two local oscillator signals are provided to each of the receiver section 20 and the transmitter section 50.

Within the receiver section 20, a received signal 14 is first provided to a bandpass filter 16 which rejects adjacent extraneous frequencies outside the bandwidth of the received signal. An input amplifier 18 amplifies the received and filtered signal to a desired amplitude level. The received signal is then provided to a mixer 22, comprising a double balanced mixer.

Within the double-balanced mixer 22, the received signal is first split by a phase spitter 24 into its two quadrature components, represented as I (in-phase component) and Q (quadrature component). The two quadrature components are then mixed with the in-phase and phase shifted local oscillator signals, respectively. The I component is mixed by mixing element 28 with the in-phase local oscillator signal, and the Q component is mixed by mixing element 26 with the phase shifted local oscillator signal. The mixing elements 26, 28 produce a signal comprising a difference in frequency between the received signal and the local oscillator signal. As a result, the quadrature components I and Q after the mixer 22 are effectively converted to baseband output signals having a single sideband and a center frequency of zero.

After the mixing step, the baseband output signals pass through sequential amplification stages, illustrated as 32, 34, 36 and 38. The amplification stages raise the amplitude of the baseband output signals to a level sufficient for a downstream correlation process.

The transmitter section 50 essentially reverses the process conducted by the receiver section 20. Quadrature baseband input signals I and Q are provided to a double-balanced mixer 52, along with the in-phase and phase shifted local oscillator signals, respectively. The I component is mixed by mixing element 54 with the in-phase local oscillator signal, and the Q component is mixed by mixing element 56 with the phase shifted local oscillator signal. The mixing elements 54, 56 produce a signal comprising a multiplication product of the quadrature baseband input signals with the local oscillator signal. As a result, the quadrature components I and Q are effectively modulated onto the local oscillator signals. The modulated quadrature components I and Q are then combined by a summer 58 that produces a single transmitted signal.

After the double-balanced mixer 52, the transmitted signal is provided to an output amplifier 62 that amplifies the signal to a desired amplitude level. The amplified signal is then provided to a low pass filter 64 which rejects high frequency harmonic components of the signal. The filtered and amplified signal is then provided to the antenna 12 for transmission.

Both the transmitted signal and the received signal pass through a switch 70 connected to the antenna 12. The switch 70 enables the antenna to be configured for transmitting operations or receiving operations. The switch 70 can be provided by mechanical switch elements, such as a relay, or can comprise solid state switching circuitry, as known in the art. It is preferable that the switch 70 have generally high speed switching characteristics to reduce delays between receiving and transmitting operations.

Although the transmitter section 50 is not necessary for operation of the receiver section 20, it should be apparent that its inclusion adds certain advantages. By using a single local oscillator for both receiving and transmitting operations without the necessity of re-tuning, the radio system can operate more efficiently and transmission delay can be reduced. Further, the radio system complexity can be significantly decreased.

Having thus described a preferred embodiment of a homodyne radio architecture for direct sequence spread spectrum data reception, it should now be apparent to those skilled in the art that certain advantages of the system have been achieved. It should also be appreciated by those skilled in the art that various modifications, adaptations, and alternative embodiments thereof may be made within the scope and spirit of the present invention. The present invention is further defined by the following claims.

What is claimed is:

1. A direct sequence spread spectrum radio system, comprising:
    an input RF amplifier for receiving and amplifying a carrier signal, $f_o$, modulated by a digital code sequence;
    a local oscillator providing a signal having a frequency equal to the frequency of the carrier signal, $f_o$;
    a first mixer receiving said modulated carrier signal and said local oscillator signal and generating a corresponding baseband output signal;
    a second mixer receiving said local oscillator signal and a baseband input signal modulated by said digital code sequence and generating a corresponding output signal; and
    an output RF amplifier for amplifying and transmitting said output signal.

2. The direct sequence spread spectrum radio system of claim 1, further comprising a phase splitter coupled to said input RF amplifier to receive said modulated carrier signal and split said signal into corresponding quadrature component signals.

3. The direct sequence spread spectrum radio system of claim 2, further comprising means for shifting phase of said local oscillator signal by +90°.

4. The direct sequence spread spectrum radio system of claim 3, wherein said first mixer combines a first one of said quadrature component signals with said local oscillator signal to generate a first quadrature baseband output signal, and combines a second one of said quadrature component signals with said phase shifted local oscillator signal to generate a second quadrature baseband output signal.

5. The direct sequence spread spectrum radio system of claim 1, further comprising antenna means for receiving said modulated carrier signal and a bandpass filter coupled to said antenna means to filter the modulated carrier signal and remove adjacent channel signals.

6. The direct sequence spread spectrum radio system of claim 1, wherein said modulated carrier signal further comprises first and second quadrature components, said first mixer generating first and second baseband output signals from said first and second quadrature components, respectively.

7. The direct sequence spread spectrum radio system of claim 1, wherein said modulated carrier frequency comprises direct sequence spread spectrum modulation.

8. A direct sequence spread spectrum radio system, comprising:
    means for receiving a received signal comprising a carrier signal, $f_o$, modulated by a digital code sequence, and for transmitting a transmitted signal comprising said carrier signal modulated by said digital code sequence;
    a local oscillator providing a signal having a frequency equal to said carrier frequency, $f_o$;
    first means for generating a corresponding baseband output signal from said received signal and said local oscillator signal; and
    second means for generating said transmitted signal from said local oscillator signal and a baseband input signal.

9. The direct sequence spread spectrum radio system of claim 8, further comprising a switch connected to said receiving and transmitting means, said switch having a first state for receiving said received signal and a second state for transmitting said transmitted signal.

10. The direct sequence spread spectrum radio system of claim 8, further comprising means for shifting phase of said local oscillator signal by +90°.

11. The direct sequence spread spectrum radio system of claim 10, further comprising a phase splitter coupled to said receiving and transmitting means to split said received signal into corresponding quadrature components.

12. The direct sequence spread spectrum radio system of claim 11, wherein said first generating means combines a first one of said received signal quadrature components with said local oscillator signal to generate a first quadrature baseband output signal, and combines a second one of said received signal quadrature components with said phase shifted local oscillator signal to generate a second quadrature baseband output signal.

13. The direct sequence spread spectrum radio system of claim 8, wherein said second generating means combines a first one of quadrature baseband input signals with said local oscillator signal to generate a first transmitted signal quadrature component, and combines a second one of quadrature baseband input signals with said phase shifted local oscillator signal to generate a second transmitted signal quadrature component.

14. The direct sequence spread spectrum radio system of claim 13, further comprising a summer coupled to said second generating means to combine said first and second transmitted signal quadrature components into said transmitted signal.

15. The direct sequence spread spectrum radio system of claim 8, wherein said receiving and transmitting means further comprises an antenna.

16. The direct sequence spread spectrum radio system of claim 8, wherein said modulated carrier frequency comprises direct sequence spread spectrum modulation.

17. A direct sequence spread spectrum radio system, comprising:

an antenna adapted to receive a signal comprising a carrier signal, $f_O$, modulated by a digital code sequence, and to transmit a signal comprising said carrier signal modulated by said digital code sequence;

a local oscillator providing a signal having a frequency equal to said carrier frequency, $f_O$;

a first double balanced mixer coupled to said antenna to receive said received signal and said local oscillator signal, said first mixer generating a corresponding baseband output signal; and a second double balanced mixer coupled to said antenna to receive a baseband input signal and said local oscillator signal, said second mixer generating said transmitted signal.

18. The direct sequence spread spectrum radio system of claim 17, further comprising a switch connected to said antenna selectable between a first state in which said received signal is coupled to said antenna and a second state in which said transmitted signal is coupled to said antenna.

19. The direct sequence spread spectrum radio system of claim 17, further comprising a phase shifter to shift phase of said local oscillator signal by +90°.

20. The direct sequence spread spectrum radio system of claim 19, wherein said first double balanced mixer further comprises:

a phase splitter coupled to said antenna to split said received signal into corresponding quadrature components;

a first mixing stage combining a first one of said received signal quadrature components with said local oscillator signal to generate a first quadrature baseband output signal; and a second mixing stage combining a second one of said received signal quadrature components with said phase shifted local oscillator signal to generate a second quadrature baseband output signal.

\* \* \* \* \*